March 20, 1956 R. D. DREW 2,738,857
CONTINUOUS GAS DEHUMIDIFICATION
Filed Oct. 23, 1952 4 Sheets-Sheet 4

INVENTOR.
Robert D. Drew
BY
Andrew L. Jaboriault
AGENT

United States Patent Office 2,738,857
Patented Mar. 20, 1956

2,738,857

CONTINUOUS GAS DEHUMIDIFICATION

Robert D. Drew, Wenonah, N. J., assignor to Socony Mobil Oil Company, Inc., a corporation of New York Application October 23, 1952, Serial No. 316,455

1 Claim. (Cl. 183—114.2)

This invention relates to a method for removing moisture from a gasiform stream continuously by means of a granular, solid desiccant. In a more specific aspect, this invention deals with the operation of such a process, so that the moisture-laden desiccant may be revivified for reuse in drying by stripping the moisture therefrom, by means of a portion of the wet gas charge and this portion of the wet gas charge may then be returned to the drying zone to be dried without the necessity of recompressing of the wet gas, so that expensive compressors are not needed. This invention is particularly applicable to the drying of gaseous petroleum fractions such as natural gas.

Suitable desiccants for use in this process include bauxite, activated alumina, and the like, and inorganic oxide gels comprising predominantly silica, or in some instances, alumina and having a high capacity to absorb moisture over a wide range of relative humidities. The desiccant should be of palpable particulate form, as distinguished from finely-divided powder and should generally be within the size range about 25–100 mesh, and preferably 4–8 mesh by Tyler standard screen analysis. The term "granular" as used herein should be understood to include any desiccant of this form. The desiccant may take the shape of pellets, tablets, spheres, capsules, and the like, or it may be of irregular shape, such as is obtained from grinding and screening operations.

The usual continuous gas dehydration process employing a granular desiccant cycles the desiccant continuously between a drying zone and a revivification zone. In the drying zone, the desiccant is maintained as a downwardly gravitating, substantially compact bed at a temperature suitable for the desired degree of dehumidification. Wet gas charge is passed through this bed and moisture removed from the gas by adsorption and condensation on the desiccant. The moisture-laden desiccant is then passed to a revivification zone and heat supplied to the desiccant to vaporize the moisture thereon. A revivification or stripping gas is passed through the desiccant to strip the moisture from it. This stripping gas is sometimes an outside gas, but is often a portion of the wet gas charge, which after use as a revivification gas, is passed to the drying zone to be dried. This latter scheme is desirable because of its simplicity and because it is potentially the most economical system. However, it has one drawback economically in that, as it is presently practiced, the revivification gas must be compressed before it is passed to the drying zone. The need for this compression adds to both the operating and initial investment costs of the process.

An object of this invention is to provide a continuous process for dehydrating wet gases wherein a portion of the wet gas charge may be used to strip moisture from the spent desiccant which overcomes the above-described difficulty.

This and other objects of this invention will be apparent from the following discussion of the invention.

Before proceeding with this discussion certain terms used in describing and claiming this invention will be defined. The terms "gas," "gasiform," and the like, are used herein to refer to a material in the gaseous phase under the existing conditions of temperature and pressure regardless of what may be its phase under normal atmospheric conditions. The term "dry gas," and like terms when applied to the gas product of the dehumidification process, are used herein merely to denote a gas which has been dehumidified to the desired extent and are not used in the limited sense as referring only to a gas completely devoid of moisture.

This invention provides, in a process of the aforementioned type for dehumidifying wet gas, for supplying wet gas charge to the process initially at a pressure sufficient to force the wet gas through the revivification zone and drying zone in succession. A major portion of the wet gas charge is passed directly to the drying zone to be dehumidified or dehydrated therein by the desiccant. A minor portion of the wet gas charge is passed upwardly through the revivification zone counter-currently to downwardly flowing moisture-laden desiccant which is flowing as a compact bed. Sufficient heat is supplied to the desiccant in the revivification zone to vaporize the moisture therein and the wet gas passing through the zone strips moisture from the desiccant. This wet gas is then removed from the upper section of the revivification zone, and cooled to condense moisture therefrom. After separation of the condensed moisture, the gas is passed upwardly through the drying zone to be dried with the main portion of the gas charge. The pressure in the drying zone is maintained sufficiently below the pressure in the revivification zone that the cooled gas from the revivification zone will pass into and through the drying zone without recompression.

This invention will be best understood by referring to the attached drawings, of which Figure 1 is an elevational view illustrating a typical process for drying petroleum natural gas utilizing this invention.

All of these drawings are highly diagrammatic in form and like parts in both bear like numerals.

In discussing these drawings, reference will be made to specific pressures and temperatures at various points in the system. These values are given only to aid in the understanding of the invention and the drawings and it is not intended to limit the invention in any way by these specific values.

Figure 1:
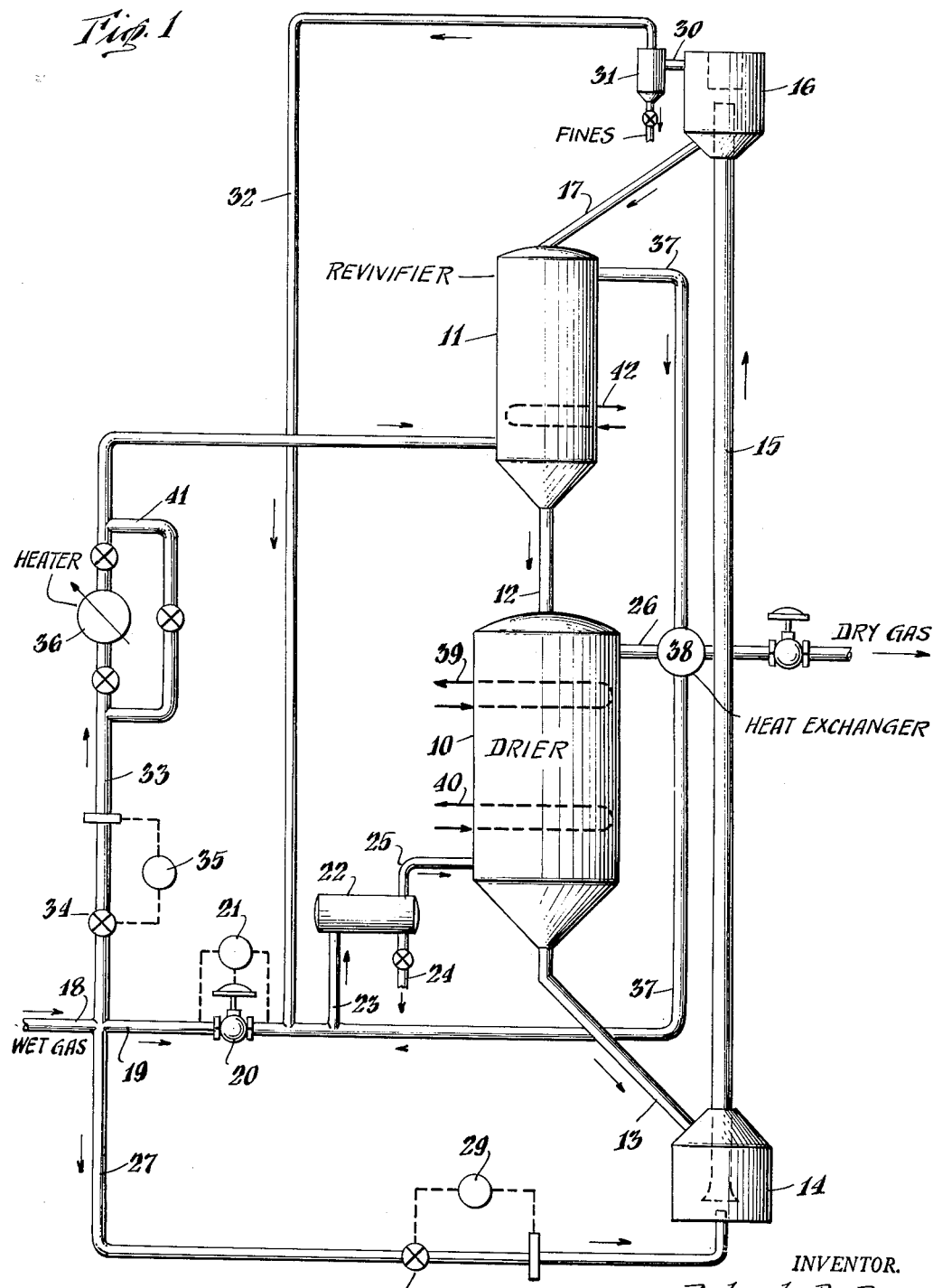

Turning to Figure 1, there is shown therein a drier 10 and revivifier 11 above the drier. Conduit 12 extends from the bottom of the revivifier into the top of the drier and terminates therein. Conduit 13 extends downwardly from the bottom of drier 10 into a lift tank 14 therebelow and lift pipe 15 extends substantially vertically upwardly into separator 16 positioned at a level above the upper end of revivifier 11. Conduit 17 extends from the lower section of separator 16 into the upper end of revivifier 11.

In operation, granular desiccant at a temperature suitable for the removal of moisture gravitates downwardly through the drying zone in vessel 11 as a substantially compact bed. Wet petroleum natural gas, which under typical conditions might be available for drying at a pressure of about 900 pounds per square inch and at a temperature of about 96° F., is supplied to the process through passage 18. A major portion of the wet gas charge passes through conduit 19 and the pressure thereof is reduced to a level below that maintained in revivifier by the use of pressure reduction valve 20 which is operated by differential pressure controller 21. The pressure in the down-stream side of valve 20 might be about 888 pounds per square inch gauge. This gas then passes into a scrubber 22 through passage 23. In the scrubber any entrained water is removed from the gas and discarded from the system through passage 24. The wet gas stream then enters the lower section of drier 10 through passage 25 at about 886 pounds per square inch gauge and 96° F. This gas flows upwardly through the drying zone and the desiccant bed therein and moisture is removed therefrom by adsorption and condensation on the desiccant. Dry gas, at a pressure of about 884 pounds per square inch gauge, is removed from the upper section of the drier through passage 26. The moisture-laden, spent desiccant passes from the lower section of drier 10 into lift tank 14. A minor portion of the wet gas charge is passed through conduit 27 at a rate controlled by valve 28 in response to flow rate controller 29 and then passed into lift tank 14. The pressure in the lift tank will about 890 pounds per square inch gauge. Moisture-laden desiccant is suspended in this gas and then elevated by the gas up through lift pipe 15 to separator 16, where the desiccant settles out of the lift gas and the lift gas is removed through passage 30 into cyclone 31. Desiccant fines are removed from the gas in cyclone 31. The lift gas is then passed through conduit 32 into the main body of wet gas charge flowing through conduit 19 and is carried with the main body of the wet gas into drier 10 to be dried. The pressure of the gas in 32 is about 888 pounds per square inch gauge and the temperature about 96° F. The moisture-laden desiccant gravitates from separator 16 through conduit 17 into the upper end of revivifier 11 and then gravitates downwardly through the revivification zone therein as a compact bed of desiccant. The compact stream of contact material in conduit 17 acts as a seal leg between separator 16 and the upper end of vessel 11. The length of conduit 17 must be sufficient to maintain a 5 pounds per square inch pressure differential between the two vessels. A second minor portion of the wet gas charge flows upwardly through passage 33 at a rate controlled by valve 34 in response to flow rate controller 35. In a preferred operation of the process of Figure 1, this gas is heated by passage through a heater 36 to a temperature suitable for vaporizing the moisture on the desiccant in the revivification zone, for example, about 360° F. The heated gas, with pressure reduced to about 895 pounds per square inch gauge by passage through the heater 36, then enters the lower section of revivifier 11 and passes upwardly countercurrently to the downwardly flowing desiccant bed therein, thereby heating the desiccant to vaporize the moisture thereon and stripping the moisture from the desiccant. The moisture-laden wet gas after use as a revivification gas passes from the upper section of revivifier 11 through conduit 37 at about 893 pounds per square inch gauge and 270° F. This gas is then passed in indirect heat exchange relationship with the dry gas from the drier 10 in heat exchanger 38 to condense moisture from the revivification gas. This reduces the gas in 37 to 888 pounds per square inch gauge and 120° F., while the pressure of the dry gas is reduced to 879 pounds per square inch gauge and the temperature thereof raised to 107° F. After this, the gas from the revivifier with condensed moisture therein flows through the lower section of passage 37 and joins the main body of the wet gas charge flowing upwardly through passage 23. The condensed moisture in the revivification gas is removed in scrubber 22 and all the wet gas passes into drier 10 through passage 25. Hot, dried desiccant passes from the lower section of revivifier 11 through conduit 12 as a compact seal column of desiccant into the upper section of drier 10 to supply the desiccant bed therein. The seal leg 12 is of restricted cross-section compared to the drying zone and revivification zone in vessels 10 and 11, respectively, and is of sufficient length to prevent excessive interchange of gas between drying and revivification zones. This hot desiccant may be cooled to a temperature suitable for the desired degree of moisture removal, such as 100° F., in several different ways. The relative rates of wet gas supply and desiccant supply to the drying zone in vessel 10 may be controlled so that the desiccant from the revivification zone is cooled to a suitable temperature within the upper 2 to 10 inches of the desiccant bed in the drier. This method of cooling the desiccant is described in detail and claimed in my U. S. patent application 316,456, filed October 23, 1952. Alternatively, the heat necessary to reduce the desiccant to the temperature suitable for the desired degree of moisture removal may be removed by circulating a suitable coolant through heating coils 39 in the upper section of the drying zone in vessel 10. The heat liberated by the moisture when it is adsorbed may be removed in part by the wet gas charge as it passes through the bed and in part by a temperature rise in the desiccant or it may be removed by circulating a suitable coolant through cooling coils 40 in the lower section of the drying zone in vessel 10.

In a less preferred form of operation of the process of Figure 1, the portion of the wet gas used for revivification need not be heated before being supplied to revivifier 11 through passage 33 and the revivification gas charge may be by-passed around the heater 36 through by-pass passage 41. The heat required for the revivification is then furnished by circulating a heating fluid through heating coils 42 in the lower section of the revivification zone. The pressure in the lower section of the revivifier will then be at 900 pounds per square inch gauge and all other pressures will be 5 pounds per square inch gauge higher than those given previously, since the 5 pounds per square inch gauge pressure drop across heater 36 is avoided.

It is apparent that this invention, as illustrated by Figure 1, offers a process in which it is possible to use a portion of the wet gas charge as a revivification gas and also pass the wet gas after use as revivification gas into and through the drying zone to be dried without the necessity of recompressing the gas between revivification and drying zones. All that is required is that the wet gas charge be supplied to the process through conduit 18 at a pressure sufficiently above atmospheric to force the gas through the revivification zone and drying zone in succession. Since many gases, such as petroleum natural gas, are available for drying at such suitable pressures, in many cases it will not even be necessary to compress the gas charge before it is supplied through conduit 18. In the operation of the process of Figure 1, the portion of the wet gas charge to be used as revivification gas is supplied to the revivifier at a pressure as close as possible to the pressure at which wet gas is charged through conduit 18 consistent with supplying the necessary heat to the revivifier. The pressure of the gas after passage through the revivifier and after cooling in heat exchanger 38 will be determined by the pressure of wet gas entry to the revivifier. Valve 20 is operated to reduce the pressure of the main body of wet gas charge to the pressure of the revivification gas after flow through heat exchanger 38 and valve 28 in lift gas line 27 is operated, so that the pressure of the lift gas from the separator in line 32 is at the pressure of the revivification gas after heat exchanger 38. Thus, the three gas streams from passage 19, 32 and 37 combine and pass into passage 23 and ultimately into drier 10. Thus, the pressure at which gas from the revivifier is available after cooling determines the pressures to which the gas flowing lines 19 and 27 are reduced.

Figure 2:
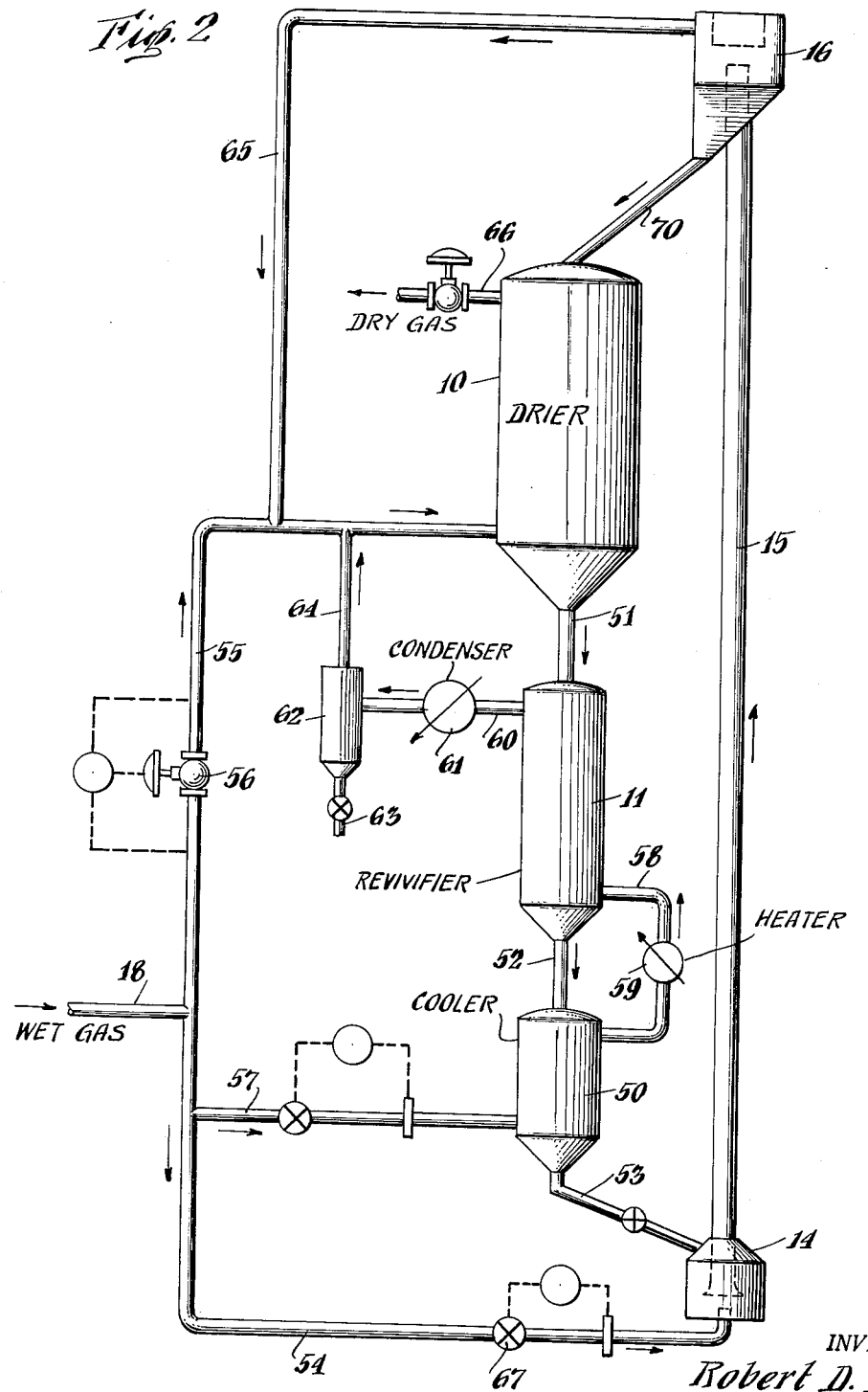
Figure 2 is an elevational view of the application of a modified form of this invention to a petroleum natural gas dehydration process.

Figure 2 illustrates a modified form of this invention. Granular desiccant gravitates cyclically through a drier 10, a revivifier 11 and a cooler 50 in that order. A seal leg 51 of restricted cross-section and sufficient length to prevent excessive interchange of gases between drier and revivifier extends from the bottom of drier 10 into the upper end of revivifier 11. A similar seal leg 52 extends from the bottom of the revivifier into the top of the cooler. Desiccant is removed from the lower end of the cooler through conduit 53 into lift tank 14 and transported upwardly through lift pipe 15 by means of a portion of the wet gas charge admitted through conduit 54 in the manner previously described. Gas and desiccant are separated in separator 16 and the desiccant passed into the upper end of drier 10 through passage 70. The wet gas in the process of Figure 2 is supplied to the process through passage 18 at a pressure sufficient to force the gas through cooler, revivifier and drier in succession. The typical conditions at which petroleum natural gas is available, namely 900 pounds per square inch gauge and 96° F. will again be assumed. A major portion of this gas is passed directly into the lower section of the drier through passage 55 to be dried by the desiccant bed therein as previously described. Before entering the drier, the pressure of this portion of the gas charge is reduced to about 884 pounds per square inch gauge by reduction valve 56. A minor portion of the wet gas charge passes through passage 54 and enters lift tank 14 to act as lift gas. The pressure in the lift tank will be about 886 pounds per square inch gauge. A second minor portion of the wet gas charge passes into the lower section of cooler 50 through passage 57 at about 900 pounds per square inch gauge and 96° F. Hot dried desiccant from the lower section of the revivifier at a temperature of about 360° F. enters the upper end of the cooler and flows downwardly therethrough as a compact bed. The wet gas passes upwardly through this bed and recovers from the desiccant the sensible heat added thereto in the revivifier, so that desiccant leaving the lower end of the cooler through passage 53 will be at about 100° F. Moisture-laden desiccant from the drier enters the upper end of the revivifier through passage 51 and passes downwardly therethrough as a compact bed. The gas used in the cooler after it has picked up the sensible heat added to the desiccant therein is removed from the upper section of the cooler through passage 58. The gas will be at about 898 pounds per square inch gauge and 132° F. Further heat is then added to this gas stream by means of heater 59 to raise the temperature of the gas stream to about 360° F. This additional heat will consist mainly of the heat of adsorption of moisture on the desiccant. Due to passage through heater 59, the pressure of the gas will drop to about 893 pounds per square inch gauge. It will be noted here that in the process of Figure 2 the only heat required to be supplied from outside the process is the heat of adsorption and/or condensation of the moisture on the desiccant plus any heat losses through the walls of passage 58 and revivifier 11, while in the process of Figure 1 the heat of adsorption and/or condensation plus the heat losses plus the heat necessary to raise the temperature of the moisture-laden desiccant to a level where the moisture could be stripped therefrom had to be supplied from outside the process. The heated gas passes upwardly through the downwardly flowing compact bed of moisture-laden desiccant in revivifier 11 and strips moisture from the desiccant in the bed. Moisture-laden gas is removed from the upper end of revivifier 11 through passage 60 at about 891 pounds per square inch gauge and 270° F. This gas is passed through condenser 61 wherein the temperature of the gas is reduced to about 100° F. to condense moisture from the gas. This condensed moisture is separated from the gas in separator 62 and discarded from the system through conduit 63. The gas, now at about 884 pounds per square inch gauge and 100° F., then passes from separator 62 through conduit 64 into conduit 55 where it mixes with the main body of the wet gas charge and passes into the drier therewith to be dried. The portion of the gas charge used as lift gas is removed from separator 15 through passage 65 at about 884 pounds per square inch gauge and 96° F. This gas also passes into conduit 55 to be mixed with the main body of the gas therein and to be passed therewith into drier 10. Dry gas is removed from the upper section of drier 10 through passage 66 at about 882 pounds per square inch gauge and 96° F. Here again, the use of an expensive compressor in the drying process is avoided. The pressure at which gas will be obtained in conduit 64 is fixed by the pressure at which wet gas charge is supplied to the process through 18, since a portion of this gas is passed without pressure reduction into cooler 50. Valve 56 is set to reduce the pressure of the gas in conduit 55 downstream of valve 56 to about the pressure of the gas in passage 64. Likewise, the throttling effect of flow control valve 67 will necessarily be such that the pressure in passage 65 will be about equal to the pressure in passage 64.

Figure 3:
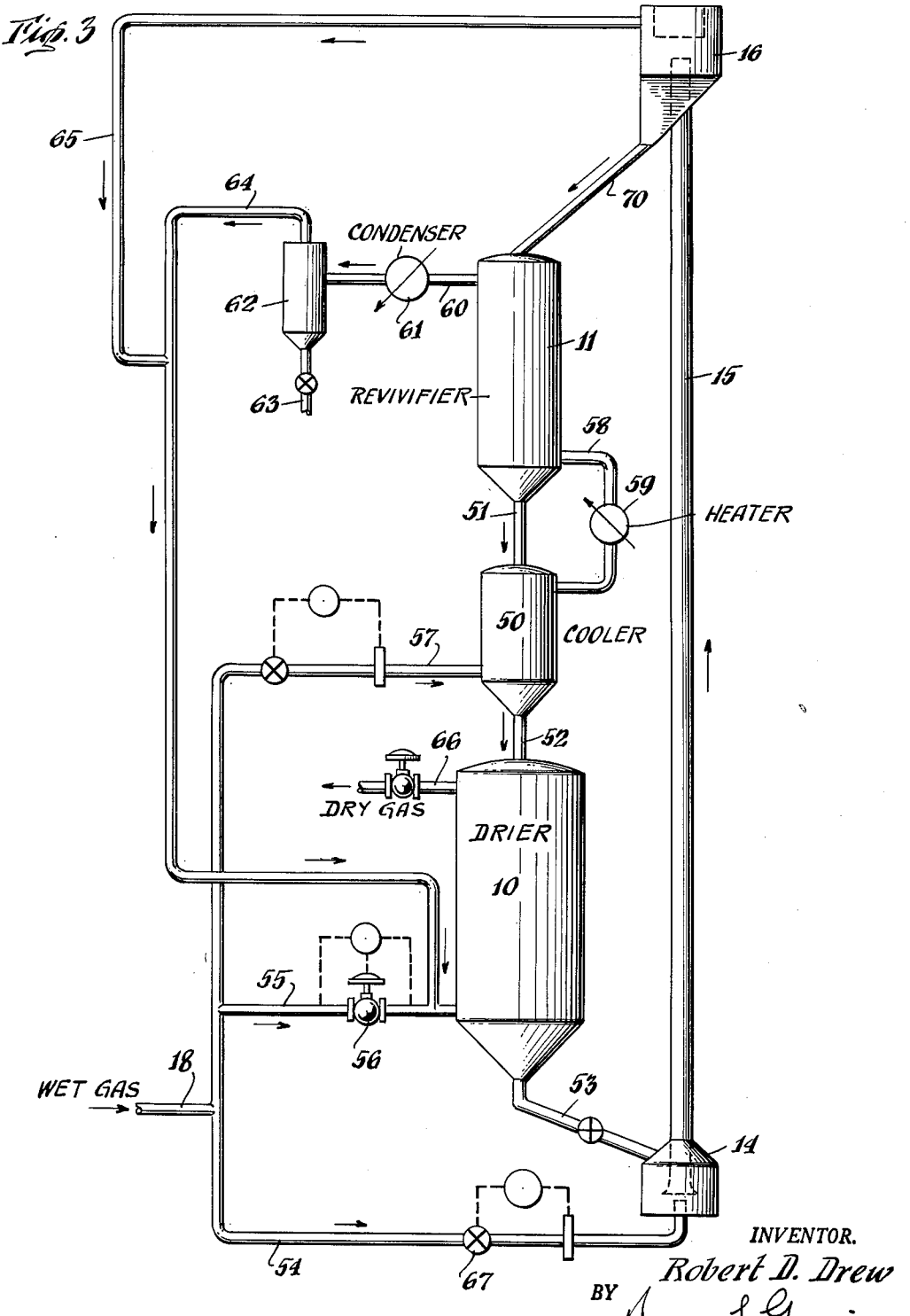
Figure 3 is an elevational view of another modified form of the invention with the cooler between the revivifier and drier.
Figure 4:
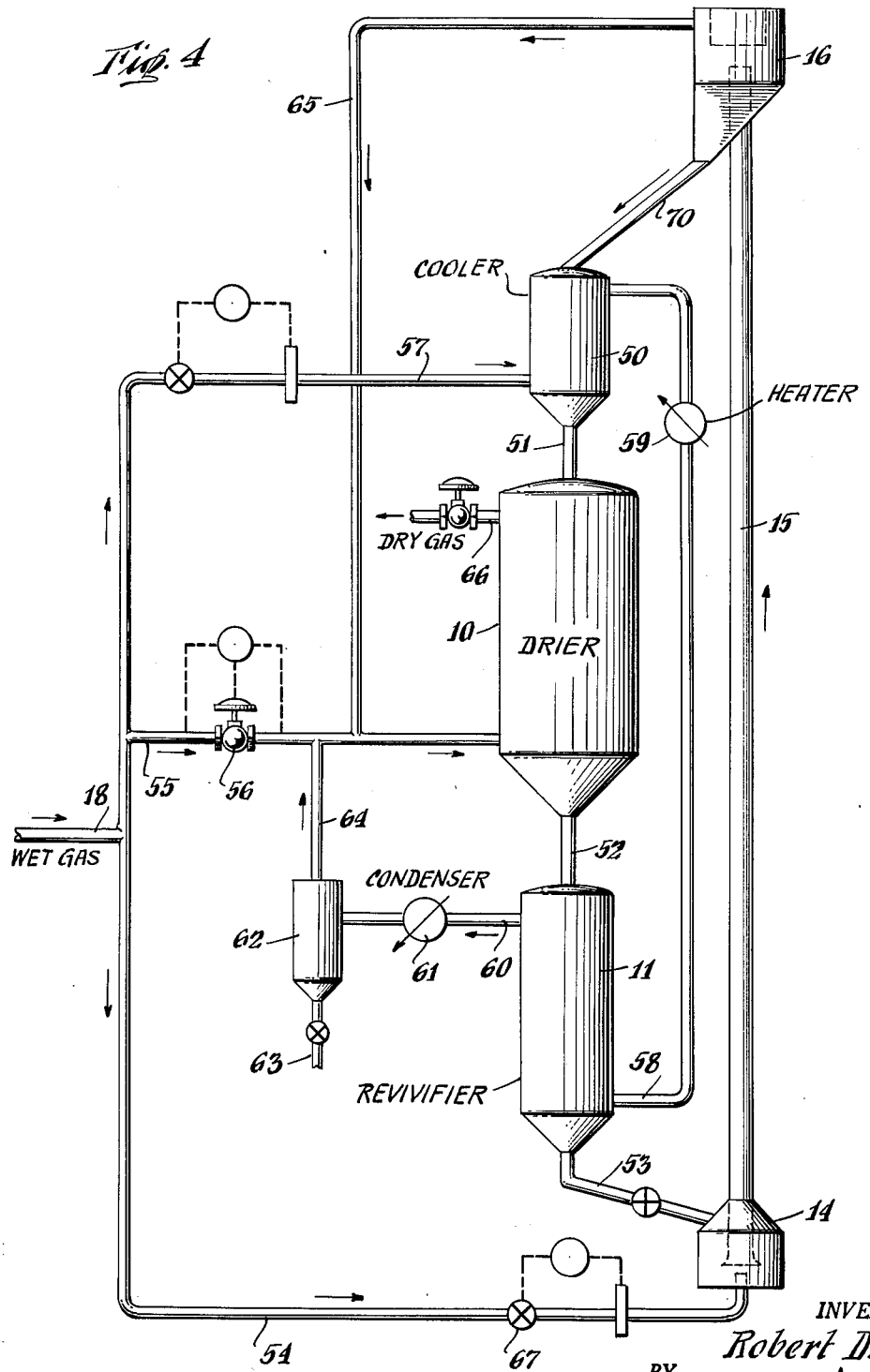
Figure 4 is another modification of the invention with the cooler above the revivifier and drier.

Figures 3 and 4 illustrate systems which operate in a fashion identical with that of Figure 2, the only difference being that in Figure 3 the revivifier is the uppermost vessel with the cooler in the middle of the drier on the bottom, while in Figure 4 the cooler is the uppermost vessel with the drier in the middle of the revivifier on the bottom. In all of the arrangements of Figures 2, 3 and 4, however, desiccant is cycled from drier to revivifier to cooler and back to drier in that order. Passages 51, 52 and 53 will function as seal legs which will be of a length determined by the two vessels between each of these conduits in a manner well known in the art.

Suitable operating conditions will vary widely in this invention with the particular wet gas charge, the particular desiccant used, and the degree of humidification desired. Generally, for the drying of petroleum natural gases, the desiccant bed in the drying zone should be at an average temperature of about 60° F. to 120° F. and preferably 60° F. to 100° F. The temperature to which the desiccant must be heated to effectively strip moisture therefrom in the revivifier will likewise vary widely with the particular desiccant. Generally, however, a temperature within the range about 300° F. to 450° F. and preferably 350° F. to 400° F. should be used. The ratio of wet gas charge to desiccant by weight supplied to the drying zone should generally be within the range about 50 to 1 to 150 to 1, and the space velocity of wet gas through the drying zone should generally be within the range about 200 to 2000 volumes of gas measured at the desiccant bed temperature and pressure in the drier per volume of desiccant bed in the drier per hour.

As an example of the operating conditions of this invention, the drying of a wet natural gas stream amounting to 68 million standard cubic feet per day by a process similar to that of Figure 1 will be considered. The wet gas is available at 900 pounds per square inch gauge and at 96° F. In a suitable design to reduce the water content of this wet gas from 54 pounds per million cubic feet to 7 pounds per million cubic feet by means of commercial Sovabead desiccant, the drier was 6 feet in diameter and 12 to 13 feet high. The desiccant bed in the drier was only 5 to 6 feet in depth. The revivifier was 3 feet in diameter and had a desiccant bed about 4 feet deep therein. The desiccant would be circulated through system at a rate of about 0.8 ton per day. Of the 68 million cubic feet per day wet gas charge, 63.6 million cubic feet would be passed directly to the drier. About 2.4 million cubic feet would be used as revivification gas, being heated to about 360° F. before being supplied to the revivifier. The remaining 2 million cubic feet would be used as lift gas. In general, the temperatures and pressures given in conjunction with Figure 1 are representative of the temperatures and pressures at the various points in the system under the conditions of this example.

It should be understood that it is intended to cover herein all changes and modifications of the examples of the invention chosen herein for purposes of disclosure

I claim:

A continuous process for the dehumidification of a wet gas stream by means of a granular solid desiccant which comprises: A drying zone, a revivification zone, a cooling zone, passing granular desiccant as a compact bed cyclically through said drying zone, revivification zone and cooling zone, the desiccant flowing from drying zone to revivification zone to cooling zone then back to drying zone, removing granular solids from the lower section of the lower zone and elevating it by means of a first minor portion of the wet gas charge to a level above the upper end of the upper zone, separating the gas from the desiccant at said level and gravitating the desiccant into the upper section of the upper zone and passing the gas so separated into the lower section of the drying zone and upwardly therethrough to effect the drying thereof, passing a major portion of wet gas charge directly into the lower section of the drying zone and then upwardly through the desiccant bed therein to effect removal of moisture from the wet gas by adsorption and condensation on the desiccant, passing a second minor portion of the wet gas charge into the lower section of the cooling zone and then upwardly through the desiccant and recover therefrom heat added in the revivification zone, passing the heated wet gas from the upper section of the cooling zone into the lower section of the revivification zone and then upwardly through the desiccant bed in the revivification zone to heat the desiccant and remove moisture therefrom, supplying additional heat to the revivification zone over and above that recovered in the cooling zone by the minor portion of wet gas to supply the heat required to vaporize moisture from the desiccant and heat losses from the process, removing the moisture-laden gas from the upper section of the revivification zone and cooling said gas to remove moisture therefrom, separating moisture from this gas and passing the gas after separation to the drying zone to be dried, supplying wet gas to the process initially at a pressure sufficient to force the wet gas through cooling, revivification and drying zones in succession, maintaining the pressure in the cooling zone sufficiently above the pressure in the revivification zone that wet gas will pass from the upper section of the cooling zone into and through the revivification zone without recompression and maintaining the pressure in the revivification zone sufficiently above that in the drying zone that cooled gas from the upper section of the revivification zone will flow into and through the drying zone without recompression, and passing desiccant from the lower section of the upper zone to the upper section of the central zone and from the lower section of the central zone to the upper section of lower zone through confined seal legs which are of restricted cross-section compared to said zones and of sufficient length to effect movement of the desiccant by gravity flow while preventing excessive interflow of gas between zones through the seal legs.

References Cited in the file of this patent

UNITED STATES PATENTS

| | | |
|---|---|---|
| 1,836,301 | Bechthold | Dec. 15, 1931 |
| 1,948,779 | Abbott et al. | Feb. 27, 1934 |
| 2,359,660 | Martin et al. | Oct. 3, 1944 |
| 2,493,911 | Brandt | Jan. 10, 1950 |
| 2,549,104 | Lechthaler | Apr. 17, 1951 |
| 2,616,515 | Berg | Nov. 4, 1952 |
| 2,629,460 | Maki | Feb. 24, 1953 |
| 2,636,575 | Watson | Apr. 28, 1953 |
| 2,638,999 | Berg | May 19, 1953 |
| 2,642,955 | Huntington et al. | June 23, 1953 |
| 2,665,769 | Walker et al. | Jan. 12, 1954 |